United States Patent [19]

Kari et al.

[11] E Patent Number: Re. 32,875

[45] Reissued Date of Patent: Feb. 21, 1989

[54] PROCESS FOR THE FROTH-FLOTATION OF A PHOSPHATE MINERAL FROM A PHOSPHATE-CARBONATE ORE

[75] Inventors: Esko T. Kari, Espoo; Jarmo Aaltonen, Siilinjarvi; Elias U. Suokas, Esoii, all of Finland

[73] Assignee: Kemira Oy, Finland

[21] Appl. No.: 154,568

[22] Filed: Feb. 8, 1988

Related U.S. Patent Documents

Reissue of:

[64] Patent No.: 4,687,571
Issued: Aug. 18, 1987
Appl. No.: 786,411
Filed: Oct. 10, 1985

[30] Foreign Application Priority Data

Oct. 11, 1984 [FI] Finland ..... 843991

[51] Int. Cl.[4] ..... B03D 1/06

[52] U.S. Cl. ..... 209/167; 209/166

[58] Field of Search ..... 209/165, 166, 167; 210/705

[56] References Cited

U.S. PATENT DOCUMENTS

| | | | |
|---|---|---|---|
| 3,403,783 | 10/1968 | Andery | 209/167 |
| 3,634,230 | 1/1972 | Odem et al. | 210/725 |
| 3,974,116 | 8/1976 | Lissant | 210/732 X |
| 4,486,301 | 12/1984 | Hsieh et al. | 209/167 |
| 4,545,898 | 10/1985 | Hellsten | 209/166 |

*Primary Examiner*—Kenneth M. Schor
*Assistant Examiner*—Andrew J. Anderson
*Attorney, Agent, or Firm*—Biebel, French, Nauman

[57] ABSTRACT

A process for the separation of phosphate minerals from a phosphate-carbonate ore, by flotation, wherein a phenol polymer such as a resol or a novolak, which improves the yield and selectivity of the phosphate minerals with respect to the carbonate minerals, is used in addition to a collector agent in the flotation.

8 Claims, No Drawings

PROCESS FOR THE FROTH-FLOTATION OF A PHOSPHATE MINERAL FROM A PHOSPHATE-CARBONATE ORE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a process for separating phosphate minerals from a phosphate ore, especially from a phosphate-carbonate ore, by flotation in the presence of a collector agent.

2. Description of the Prior Art

In the art, a large number of processes and compounds are known for seclective froth-flotation of phosphate minerals from ores which contain phosphate. One such process is presented in Finnish Patent Application No. 811333, wherein an anionic collector agent, usually a fatty acid, is first added to an aqueous slurry of the ore or of its concentrate, whereafter the slurry is subjected to flotation in order to remove a silicate-containing waste from the concentrate. Next the slurry is treated with an alkali in order to remove the collector-agent covers from the mineral surfaces, and finally the combined concentrate is floated by using a cationic collector agent, especially an amine-type collector agent, the pH being neutral or mildly acidic, in order that the phosphate concentrate be separated in as pure a form as possible.

From Finnish Patent Application No. 790725 there is also known an amphoteric surface-active agent to be used as a collector agent. Such an agent has been obtained, for example, by allowing a suitable amino compound, e.g. methyl alanine or methyl glycine, to react with an epoxy or chlorohydrin compound. In order to obtain the best result, the hydrophilic and hydrophobic portions of the collector agent can, in this as in other known amphoteric agents, be varied by adjusting the length of the carbon chain and, for example, the number of ether bonds.

Furthermore, from Finnish Patent Application No. 783804 there is known a collector agent composition which is based on a monoester of sulfosuccinic acid and a fatty acid based on a vegetable or animal oil, the contents of the constituents in the composition ranging from 1–99% to 99–1%, calculated according to weight.

At present, fatty acids are perhaps the most commonly used collector agents. The fatty acids may be unsaturated or, for example, technical fatty acid compositions. There are also other compounds among the proposed collector agents, such as alkyl benzene sulfonate, alkyl sulfate, and amines.

In order to enchance the selectivity of the separation of phosphate and carbonate minerals, and in order to improve the yield, various regulating chemicals are often also used in flotation. By using additives it is often also possible to decrease the total consumption of chemicals and/or the costs. Generally known regulating chemicals include waterglass, corn starch, gum arabic, carboxymethylcellulose, neutral oil, carbon or sulfur dioxide gas, and various emulsifiers and frothers. The known processes and chemicals have the disadvantage that the grade of the phosphate concentrate usually remains low when the aim is a high recovery, especially as carbonate minerals float along with phosphates.

SUMMARY OF THE INVENTION

The object of the present invention is to provide a process by means of which phosphate minerals such as apatite can be separated effectively and selectively from other minerals. According to the present invention it has surprisingly been discovered that a synergistic action is achieved when a phenol polymer is used in addition to a collector agent in the flotation, the recovery and selectivity being thereby improved, especially as regards carbonate minerals.

Recommended agents according to the invention, increasing the selectivity, are various phenol-formaldehyde copolymers, such as resol, novolak and modified phenol polymers, for example a melamine-modified novolak.

Resol and novolak are synthetic polymers where the frame structure, the distances between functional groups and the proportion of the components can be regulated relatively freely. According to A. A. K. Whitehouse, E. G. K. Pritchett and G. Barnett, Phenolic Resins, 1967, Iliffe Books Ltd., London, pp. 6–91, especially p. 7, these can be defined as follows, for example:

Resol is a synthetic resin which is made from phenol and aldehyde. Its molecule contains reactive methylol groups or substituted methylol groups.

Novolak is a soluble, easily melting synthetic phenolic resin which does not contain reactive methylol groups or substituted methylol groups.

According to the literature, novolak can be prepared from phenol and formaldehyde in the presence of, for example, an acid catalyst. The acid catalytic formation of methylol phenols is a relatively slow process, but the condensation of methylol phenol with phenols to dihydroxy diphenyl methane is rapid. Therefore the latter compounds are prevalent in novolaks, Equation (1).

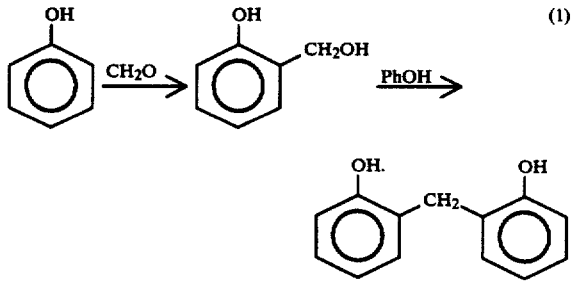

(1)

The above reaction can continue further, whereby polynuclear phenolic chains are formed, of which we can mention the following

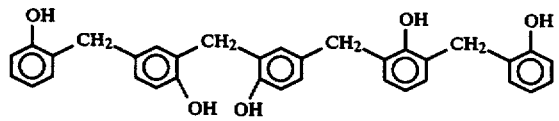

Novolaks proper are compositions of isomeric polynuclear phenol chains such as the above. Some amount of unreacted phenol is always left in the reaction mixture.

It is stated in the literature that resol can be prepared from phenol and formaldehyde in the presence of, for example, an alkali catalyst. The alkali-catalytic addition reaction of phenol and formaldehyde is more rapid than the condensation reaction following it. From this it follows that methylol phenols are prevalent intermediate products, Equation (2).

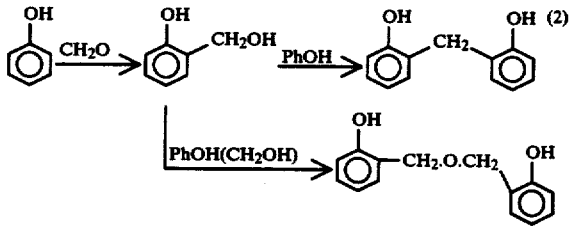

The methylol phenols which contain reactive methylol groups condense further either together with other methylol groups, thereby forming ether bonds, or more commonly with the reactive atoms (in the ortho- or the para-position) of the benzene ring, thereby forming methylene bridges such as those in novolaks. In both cases, water breaks off in the reaction.

Resols may, for example, have on average three to four benzene rings, and the following can be mentioned as an example

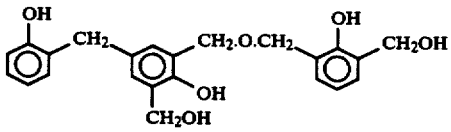

In addition to water, there may also be phenol, methylol phenols and formaldehyde polymers present as residues in resol.

When phenol polymers of this type are used in flotation, selectivity, concentrate purity and recovery, as well as the quality of the froth, improve. The use of phenol polymers enables conventional non-selective collector agents, such as fatty acids, amino acids and sulfonic acids, and mixtures of the same, to be used effectively. In flotation it is possible to use common regulating agents known in the art, such as depressing agents, emulsifiers, dispersing agents, and frothing oils. The conventional physical conditions such as the temperature and the pH of the slurry are also regulated in the known manner in the flotation process.

DESCRIPTION OF THE PREFERRED EMBODIMENT

Figure 1:
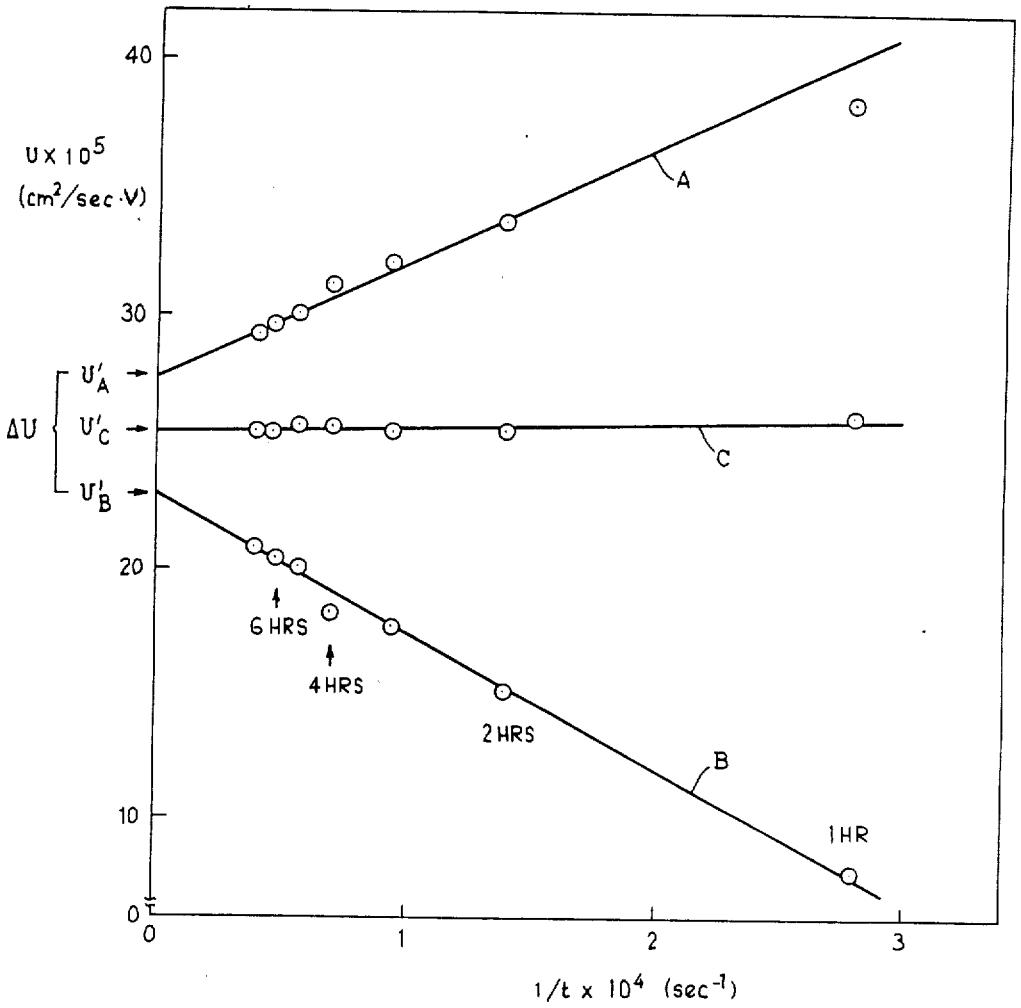
Figure 2:
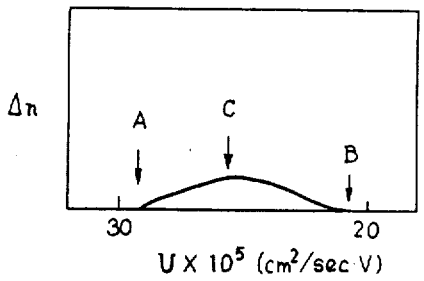
Figure 3:
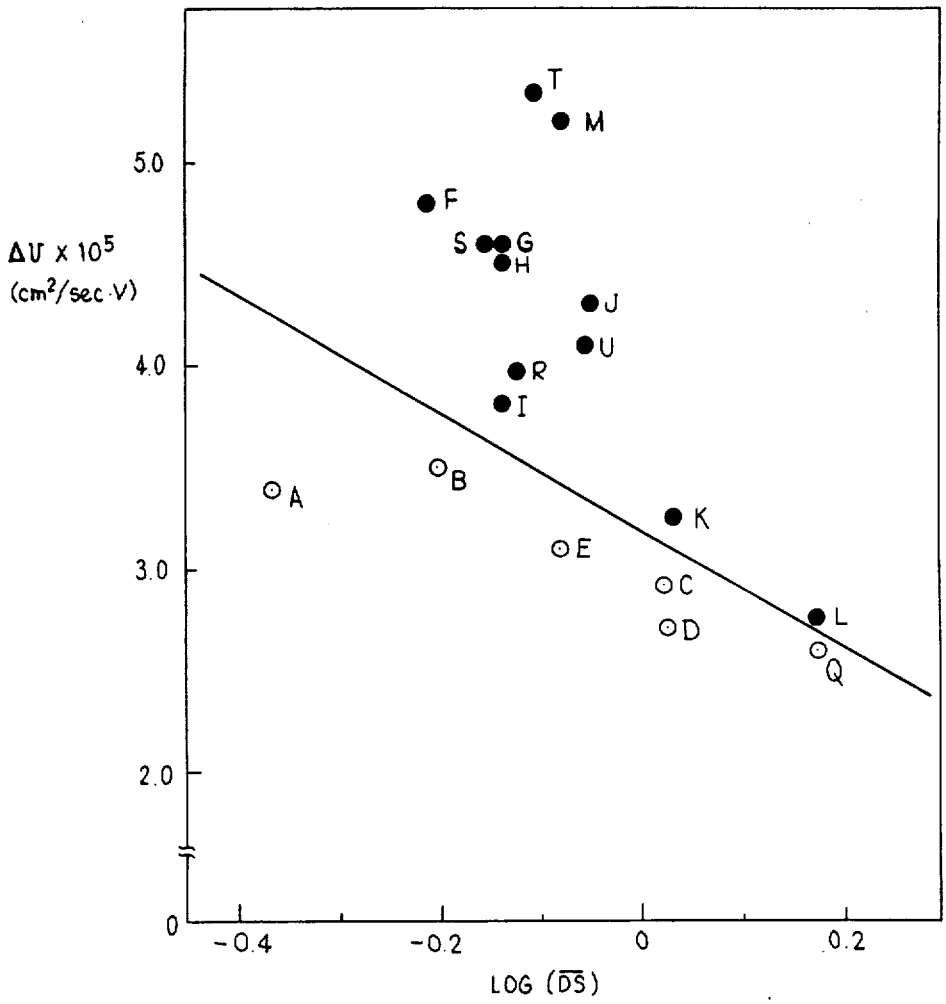
Figure 4:
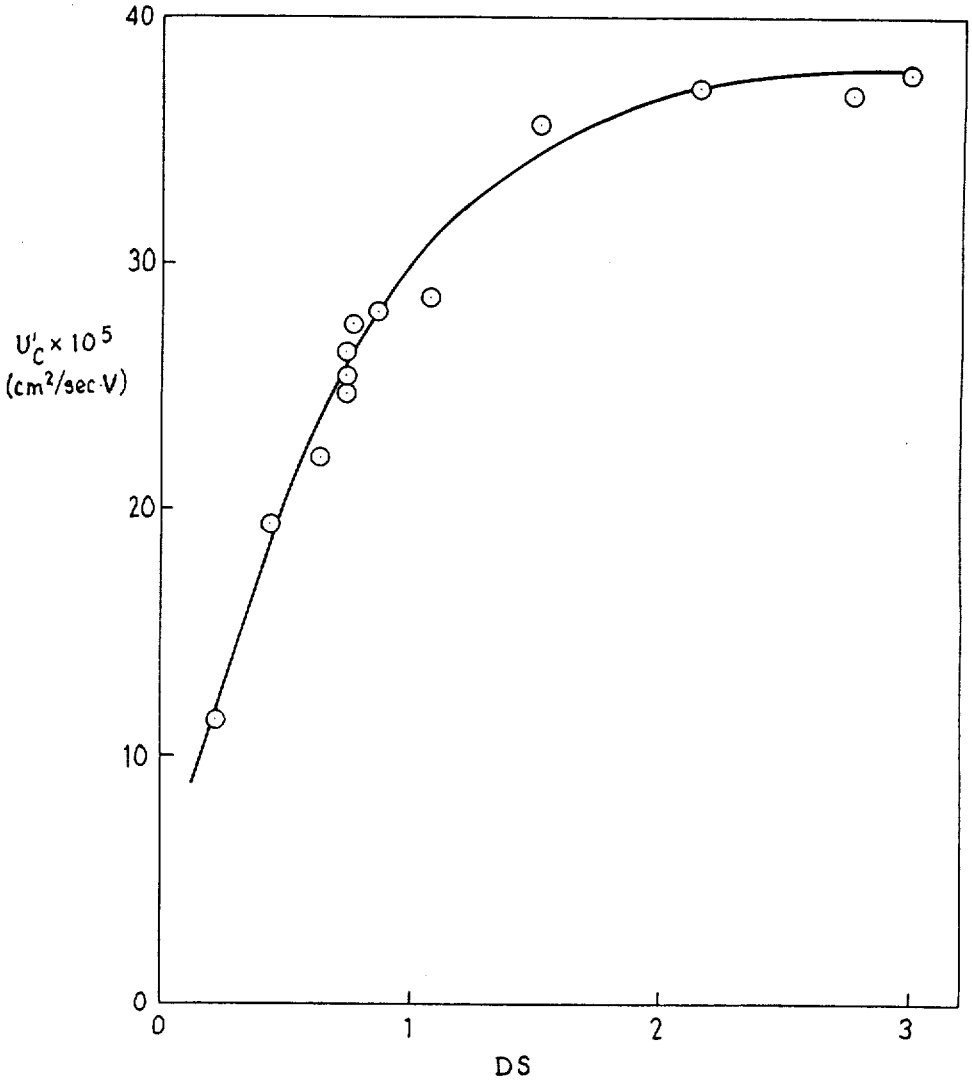

The invention is illustrated below with the aid of examples.

Example 1

A phosphate-carbonate ore which contained 6.9% fluorapatite and 30.8% carbonates, the balance being silicate minerals, was crushed to a particle size under 3 mm. A one kg batch of the homogenized ore was ground with 0.7 liters water to a fineness of 37%—74 μm i.e., about 37% by weight of the homogenized ore has a particle size less than 74 microns. The ground material was slurried into 3 liters water, and resol was added to the slurry at a rate of 125 g/t, tall oil fatty acid at 50 g/t, and triethoxy butane (TEB) at 10 g/t, and the slurry was conditioned for 10 minutes. Thereafter, a rougher flotation was carried out in a 3-liter cell, and the obtained rougher concentrate was subjected to three cleaner flotations in a 1.5-liter cell, whereby the following results were obtained.

| | % $P_2O_5$ | Recovery, % |
|---|---|---|
| Ore | 4.0 | |
| Apatite concentrate | 35.9 | 80.6 |

By the procedure presented in Example 1, but by varying the chemicals used and/or their amounts, the following results were obtained.

| Example | Collector | | Frother[a] | | | Apatite concentrate | |
|---|---|---|---|---|---|---|---|
| No. | agent | (g/t) | (g/t) | Phenol polymer | (g/t) | % $P_2O_5$ | Recovery, % |
| 1 | TFA[b] | 50 | 10 | Resol | 125 | 35.9 | 80.6 |
| 2, control | " | 50 | 10 | — | | 28.7 | 78.3 |
| 3 | " | 100 | 10 | Resol | 250 | 28.4 | 83.2 |
| 4 | " | 100 | 10 | Resol | 350 | 35.8 | 81.3 |
| 5 | PS[c] | 250 | 10 | Resol | 200 | 35.7 | 84.9 |
| 6, control | " | 250 | 10 | — | | 18.4 | 63.7 |
| 7 | " | 100 | 10 | Melamine-modified novolak | 150 | 39.2 | 82.3 |
| 8 | " | 250 | — | Novolak | 50 | 30.2 | 93.9 |
| 9, control | " | 250 | — | — | | 25.5 | 61.9 |
| 10, control | AA[d] | 200 | — | — | | 26.5 | 85.2 |
| 11, control | " | 400 | — | — | | 31.2 | 81.0 |
| 12 | " | 200 | — | Resol | 200 | 36.4 | 85.0 |

[a]Triethoxy butane (TEB) or other
[b]Tall oil fatty acid
[c]Petroleum sulfonate
[d]Aminoacid

What is claimed is:

1. A process for the separation of phosphate minerals from a phosphate-carbonate ore comprising froth flotation of the phosphate minerals in the presence of a collector agent and a phenol polymer wherein said phenol polymer improves the selectivity of said process for phosphate minerals.

2. The process of claim 1 wherein said phenol polymer is a phenol-formaldehyde copolymer.

3. The process of claim 2 wherein said phenol-formaldehyde copolymer is selected from the group consisting of resols, novolaks and melamine modified phenol polymers.

4. The process of claim 3 wherein said modified phenol polymer is a melamine-modified novolak.

5. The process of claim 3 wherein said collector agent is selected from the group consisting of fatty acids, amino acids, sulfonic acids and mixtures thereof.

6. The process of claim 5 wherein said phenol-formaldehyde copolymer is resol.

7. The process of claim 6 wherein said collector agent is a fatty acid.

8. The process of claim 7 wherein said recovered phosphate mineral is apatite.

* * * * *

UNITED STATES PATENT AND TRADEMARK OFFICE

CERTIFICATE OF CORRECTION

PATENT NO. : Re. 32,875

DATED : February 21, 1989

INVENTOR(S) : Esko T. Kari, Jarmo Aaltonen, Elias U. Suokas

It is certified that error appears in the above-identified patent and that said Letters Patent is hereby corrected as shown below:

On the title page, item [75], the residence of inventor Elias U. Suokas should read --Espoo--

Delete all drawings, Sheet 1 through 4.

Signed and Sealed this

Fourteenth Day of May, 1991

*Attest:*

*Attesting Officer*

HARRY F. MANBECK, JR.

*Commissioner of Patents and Trademarks*